UNITED STATES PATENT OFFICE.

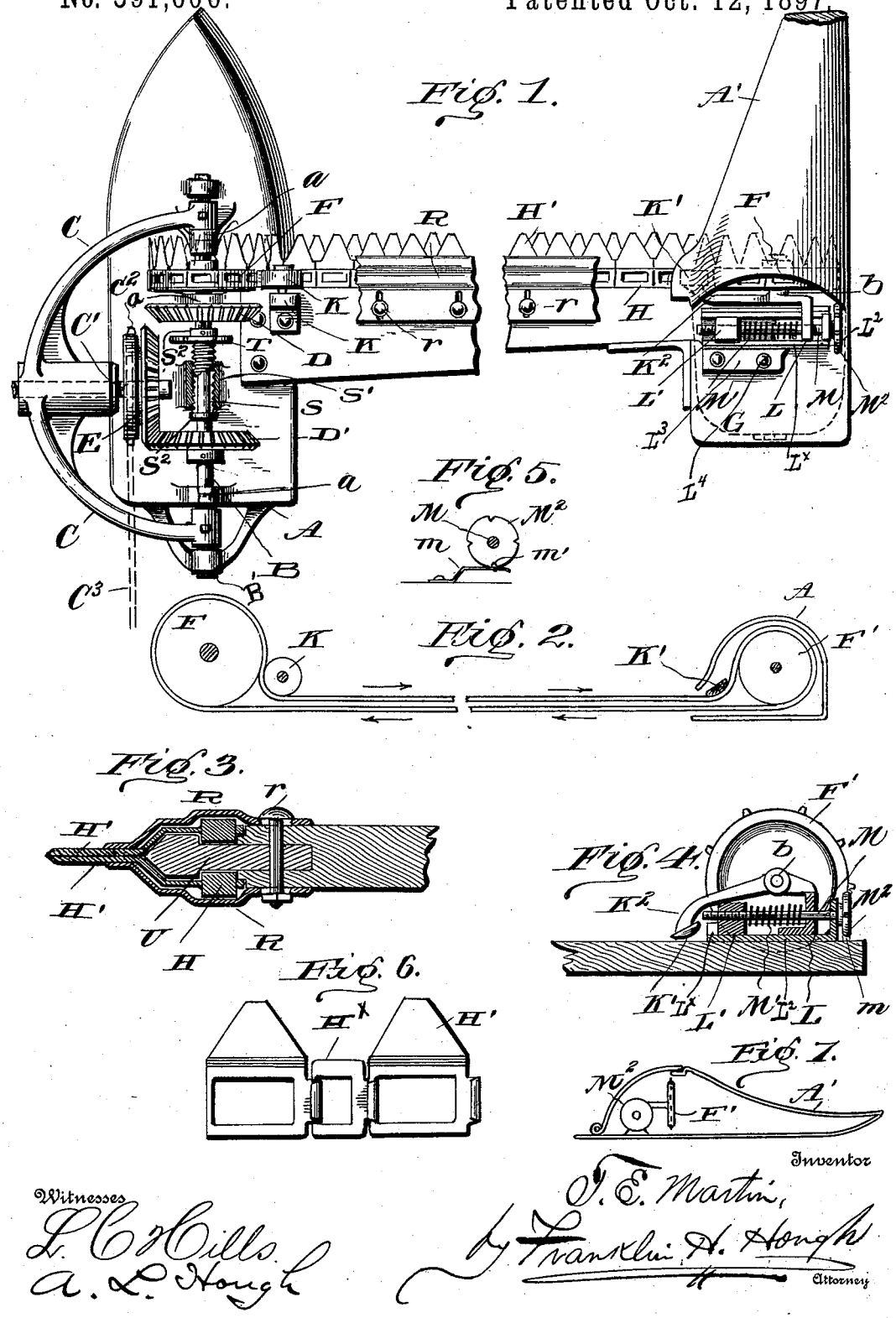

THOMAS EUGENE MARTIN, OF RUSH, NEW YORK.

ENDLESS-CHAIN CUTTER.

SPECIFICATION forming part of Letters Patent No. 591,606, dated October 12, 1897.

Application filed June 4, 1897. Serial No. 639,450. (No model.)

*To all whom it may concern:*

Be it known that I, THOMAS EUGENE MARTIN, a citizen of the United States, residing at North Rush, in the county of Monroe and State of New York, have invented certain new and useful Improvements in Endless-Chain Cutters for Mowing and Harvesting Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in harvesting machinery, and especially to the provision of an endless-chain cutter in which the links of the chain are provided with cutting-teeth which are of the ordinary shape, the inner broad flat faces of which teeth are designed to contact when passing in opposite directions, thereby producing a draw cut on the adjacent cutting edges as the chain is caused to revolve and dispenses with the use of the pitman and high speed.

A further part of the invention resides in the provision of novel means whereby the motion which is imparted to the endless cutting-chain may be reversed, thus bringing into play the cutting edges on the opposite sides of the cutting-teeth. In connection with the endless cutter I employ means for taking up the tension and keeping it in a taut relation, thereby preventing any kink or backlash in the chain.

To these ends and to such others as the invention may pertain the same consists, further, in the novel construction, combination, and adaptation of the parts, as will be hereinafter more fully described, and then specifically defined in the appended claims.

My invention is clearly illustrated in the accompanying drawings, which, with the letters of reference marked thereon, form a part of this specification, and in which—

Figure 1 is a top plan view of my improved endless-chain cutter, shown with geared connection with a sprocket-wheel which is propelled from the main shaft of the mower or other suitable means when cutter is applied to reapers and self-binders. Fig. 2 is a side elevation of the cutter-chain. Fig. 3 is a diagrammatic view on line 3 3 of Fig. 1. Fig. 4 is a detail view showing tension-regulating means. Fig. 5 is a detail view of the hand-wheel adapted to reverse the motion of the cutter-knives. Fig. 6 is a side elevation of a section of the cutter-chain. Fig. 7 is a detail showing the hinged casing at outer end of cutter-bar.

Reference being had to the details of the drawings by letter, A designates a shoe which supports the cutting mechanism and is provided with integral lugs $a$, in which is journaled the shaft B, and stub-shafts B', mounted in lugs on said shoe, form pivots for bracket-arms C, which bracket-arms are secured in any suitable manner to the frame of the mower. Journaled in the central portion of the said bracket is a shaft C', on which is loosely mounted a sprocket-wheel $C^2$, which receives motion through the chain $C^3$, which may be connected in any suitable manner to a propelling mechanism on the mower-frame.

Keyed to the shaft B are the bevel-geared wheels D and D', which may be thrown into mesh with the geared wheel E when it is desired to have the endless chain revolve in one direction or in a reverse direction by mechanism which will be hereinafter more clearly set forth.

Splined to the shaft B is a sprocket-wheel F, and a similar sprocket-wheel F' is loosely journaled on a stub-shaft $b$, carried at the outer end of the cutter-bar, and over these sprocket-wheels my improved endless cutting-chain is mounted. This cutting-chain consists of links H, each of which is provided with a cutting-blade H', which blade is of the ordinary construction of cutting-blades on cutter-bars of harvesting-machines, beveled on both edges and having offsets or drops to allow the blades to contact, and so constructed as to allow the links to be replaced easily, and each cutting-link is connected to a short plain link $H^\times$, or every link provided with a knife. These cutting-blades are brought together by means of idlers K and K', the former of which, K, is in the shape of a pulley mounted on a stub-shaft carried by a lug $k$ on the cutter-bar frame, while the idler K' is mounted on an arm $K^2$, in which arm is carried the stub-shaft $b$, carrying the sprocket-wheel F', and the inner end of the said arm is either integral with or secured to the casting L, which has a longitudinal movement at the outer end of the cutter-bar frame. This casting L is mounted on a plate $L^2$, secured to the outer end of the cutter-bar frame, and the said casting L has a longitudinal movement on the regulating-screw M, which is journaled in the upturned end of the said plate $L^2$ and held therein by means of a pin, as clearly shown in Fig. 4 of the drawings. This plate $L^2$ is held in any suitable manner to the shoe at the outer end of the cutter-bar, and the screw-threaded nut L', which is carried on the said screw M, may be drawn backward and forward on the said screw in order to regulate the tension of the spring M', carried on the said screw. This nut L' is held between the guides $L^3$ with the upturned flanges $L^X$, which guides are held to the shoe by means of suitable bolts $L^4$. When it is desired to increase the tension of the spring, the hand-wheel $M^2$ on the end of the screw M is operated so as to draw the said nut farther in on the threads of the said screw, the nut being guided between the guide-strips $L^3$. By this means the endless cutting-chain may be always kept in a taut relation.

The wheel M' has notches about its periphery in which a lug $m'$ on a spring $m$ is adapted to engage in order to hold the adjustment in a fixed relation. By this arrangement it will be seen that as the screw M is revolved the nut L' is moved longitudinally, the tension of the spring M' may be regulated, and the idler K', bearing against the endless chain will keep it taut and thus prevent backlash and avoid any difficulty that would result from any loose play to the shaft or chain-cutter which would impair its effectiveness.

At the outer end of the cutting-bar is the shoe A', which is hollowed out, forming a protection to the tension-regulating mechanism, and a cover to the same is hinged to the cutter-bar, so as to make it convenient to remove the chain-cutter and get at the working parts.

In order to hold the knives with their faces in contact, the guide and keeper plates R are fastened to the cutter-bar and are held thereto by means of the bolts $r$ through a slot which allows an adjustment. The shape of these guides is better shown in Fig. 3 of the drawings, in which it will be seen that they are bent to conform to the shape of the links carrying the cutter-blades.

In order to reverse the motion of the endless cutting-chain, I provide a threaded sleeve S, which is hollow and adapted to receive the shaft B, and said sleeve works through the threaded aperture in the lug S' on the shoe A, and at each end of the sleeve S are collars $S^2$, against which the ends of the sleeve may bear when it is desired to move the said shaft longitudinally. Integral with the said sleeve is a hand-wheel similar in construction to the wheel shown in Fig. 5 and is provided with a spring-stop similar to that shown at $m$. By this means it will be seen that by turning the hand-wheel T in one direction or the other one of the geared wheels D or D' may be brought into mesh with the propelling-wheel E in order to drive the cutter-chain in one direction or the other. By this means both cutting edges of the knives are brought into play, and as a consequence one set of cutting-teeth may be operated for a longer period than would be the case if the cutting-chain were designed to travel in but one direction.

If desired, the cutting-chain, with its attachments to the cutter-bar, may be raised from a horizontal position to vary the height at which it is desired to have it operate and will work equally as well at an angle as it would in a horizontal position. While no means is shown for raising the cutter-bar from a horizontal position, still any suitable mechanism may be employed for this purpose.

In order to hold and guide the endless cutting-chain and prevent backlash, the strip U is provided, which has a slot for adjustment, and strip U is seated in a recess in the edge of the cutter-bar and has a head, which forms with the edge of the cutter-bar a guide to hold the links of the chain truly as they pass under the idlers and over the sprocket-wheels, while the outer end of the said strip is tapered, forming guides for the inner faces of the cutting-knives, as will be clearly seen in Fig. 3 of the drawings.

The chain-cutter may be used either with or without guards, as preferred.

Having thus described my invention, what I claim to be new, and desire to secure by Letters Patent, is—

1. In an endless chain cutter, the combination with the endless chain, the tension-regulating plate L, movably held to the outer end of the cutter-bar, the idler-carrying arm mounted on said plate, and carrying the outer sprocket-chain wheel, of a casting $L^2$, on which the plate is mounted, and an apertured screw-threaded nut L', of the threaded bolt working through said nut, a spring interposed between the nut and movable plate, and a hand-wheel at the outer end of the said adjusting-bolt, and spring-catch to hold the hand-wheel in a fixed position, substantially as described.

2. In an endless-chain cutter, the combination with the shoe A, the shaft B mounted in lugs thereon, the bracket-arms journaled to the said shaft, of the sprocket-carrying chain-wheels, the beveled geared wheels D and D', of the collars S², keyed to shaft B, the threaded lug S, and hollow sleeve carried therein, and through which sleeve the shaft B is loosely journaled, of the hand operating-wheel integral with the sleeve and a spring-actuated catch $m$ designed to normally engage in a notch in the periphery of the said hand-wheel, substantially as described.

In testimony whereof I affix my signature in presence of two witnesses.

THOMAS EUGENE MARTIN.

Witnesses:
EDWIN P. CLAPP,
EDSON H. MARTIN.